Feb. 20, 1951 C. B. FAVERTY ET AL 2,542,318
CAR WHEEL BORING MACHINE
Filed Nov. 29, 1946 7 Sheets-Sheet 1

Inventors,
Clyde B. Faverty,
Arthur H. Hartwig,
William J. McDonald, &
Louis Wulff.
By Oscar Hochberg. Atty.

Feb. 20, 1951  C. B. FAVERTY ET AL  2,542,318
CAR WHEEL BORING MACHINE
Filed Nov. 29, 1946  7 Sheets-Sheet 2

Inventors,
Clyde B. Faverty,
Arthur H. Hartwig,
William J. McDonald, &
Louis Wulff.
By Oscar Hochberg. Atty.

Feb. 20, 1951  C. B. FAVERTY ET AL  2,542,318
CAR WHEEL BORING MACHINE
Filed Nov. 29, 1946  7 Sheets-Sheet 3

Inventors.
Clyde B. Faverty,
Arthur H. Hartwig,
William J. McDonald, &
Louis Wulff.
By Oscar Hochberg.
Atty.

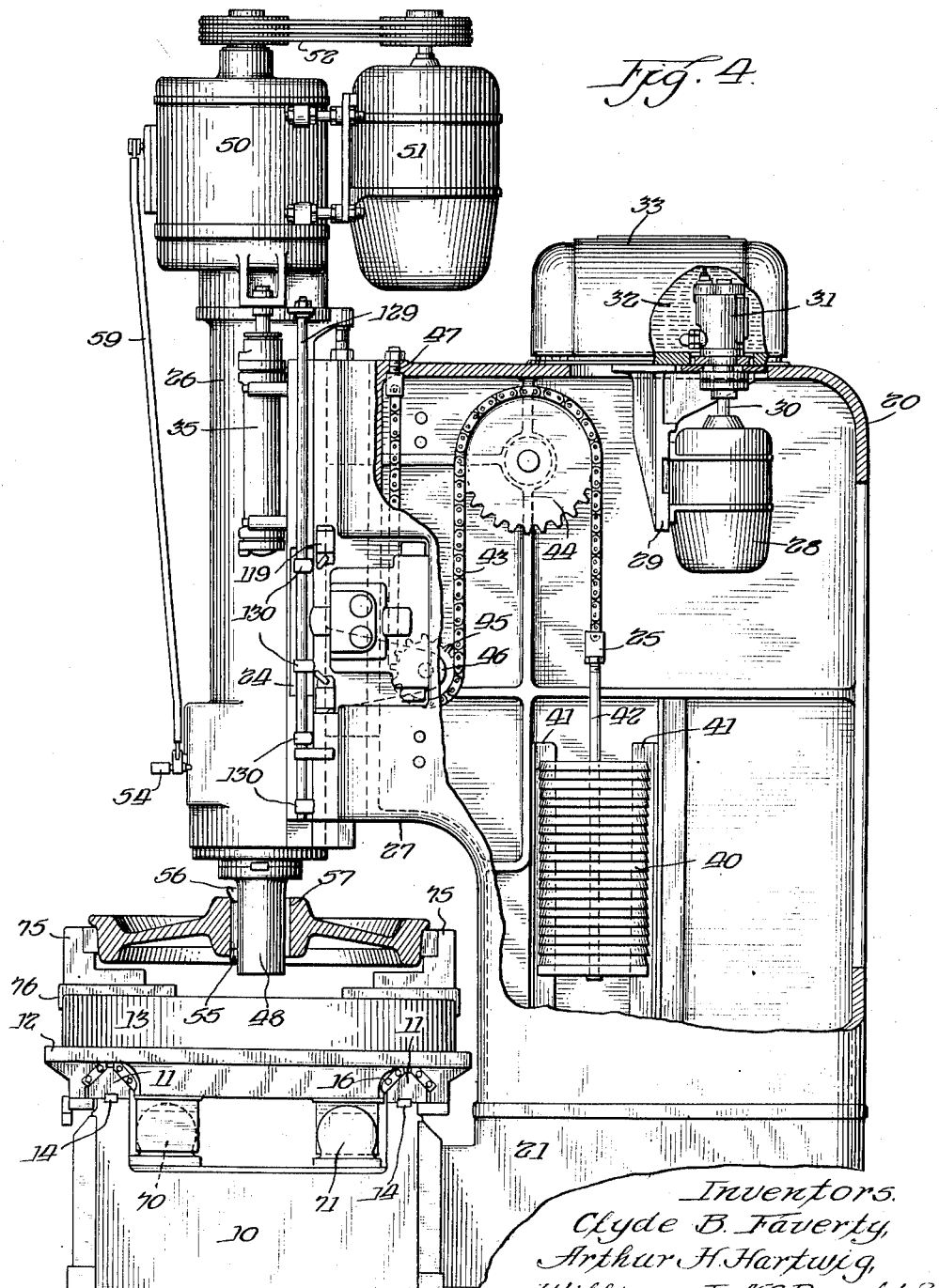

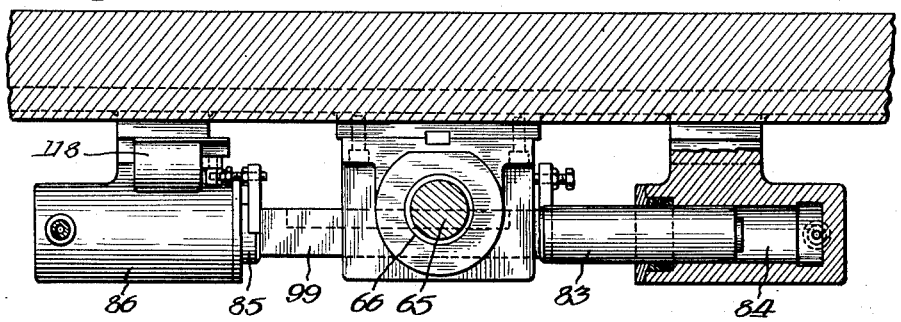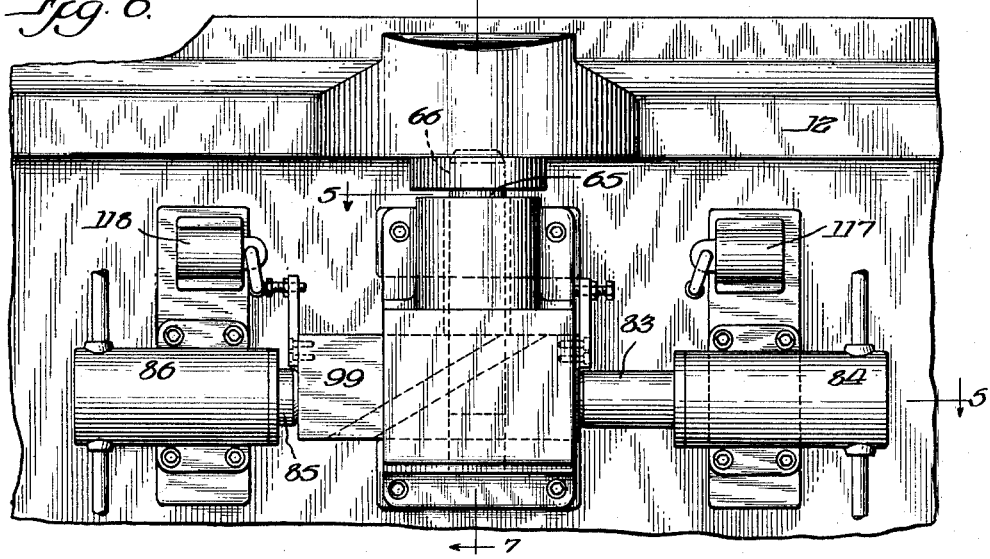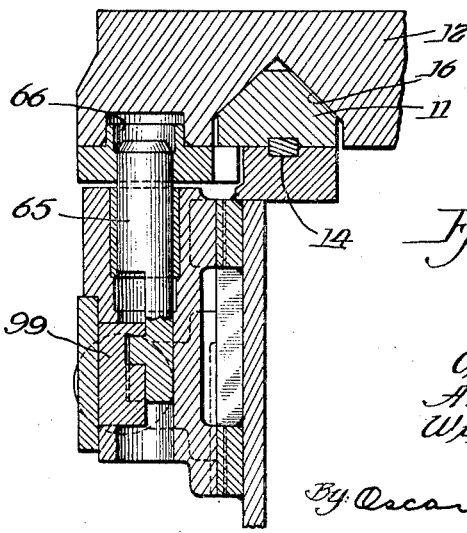

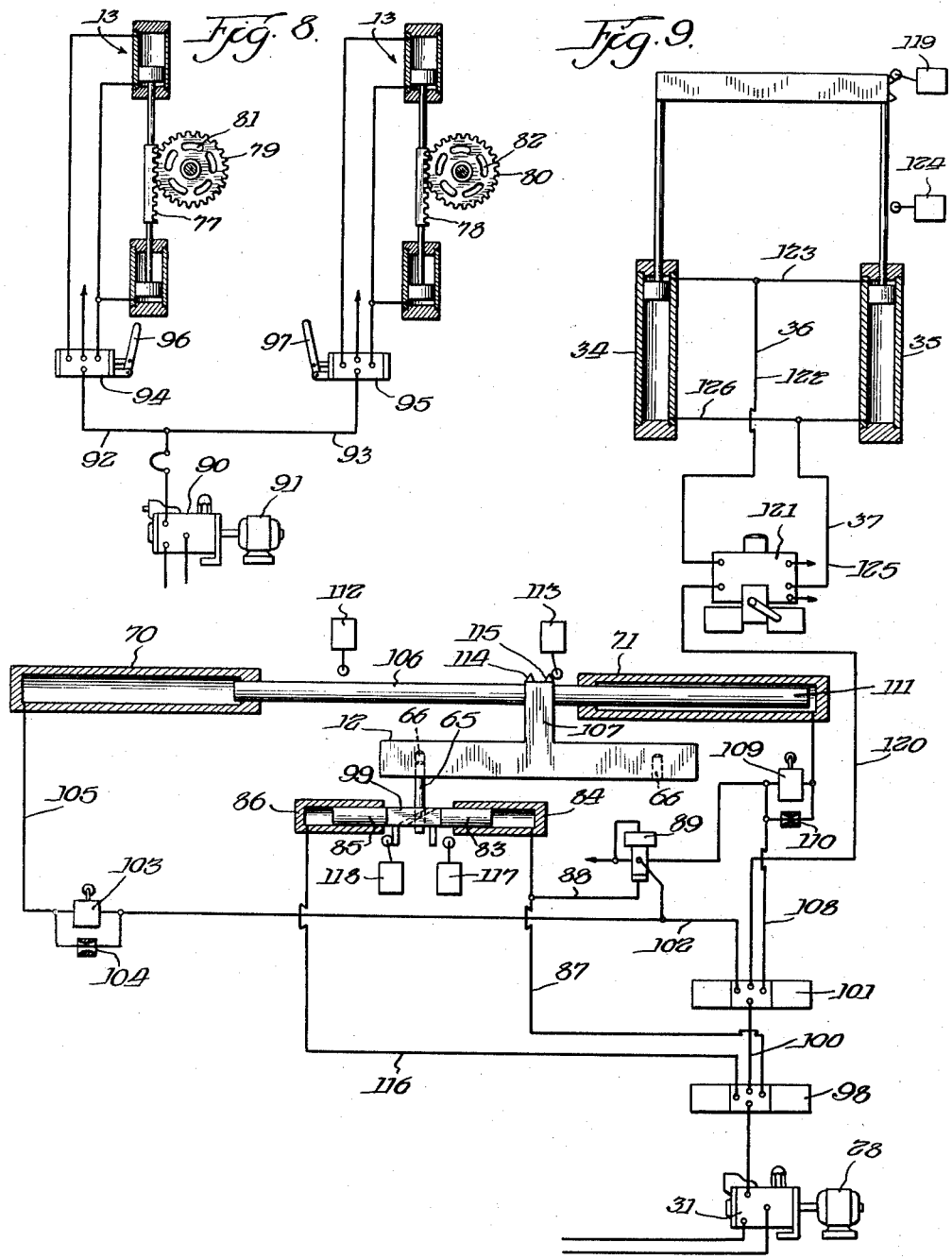

Feb. 20, 1951   C. B. FAVERTY ET AL   2,542,318
CAR WHEEL BORING MACHINE
Filed Nov. 29, 1946   7 Sheets-Sheet 7
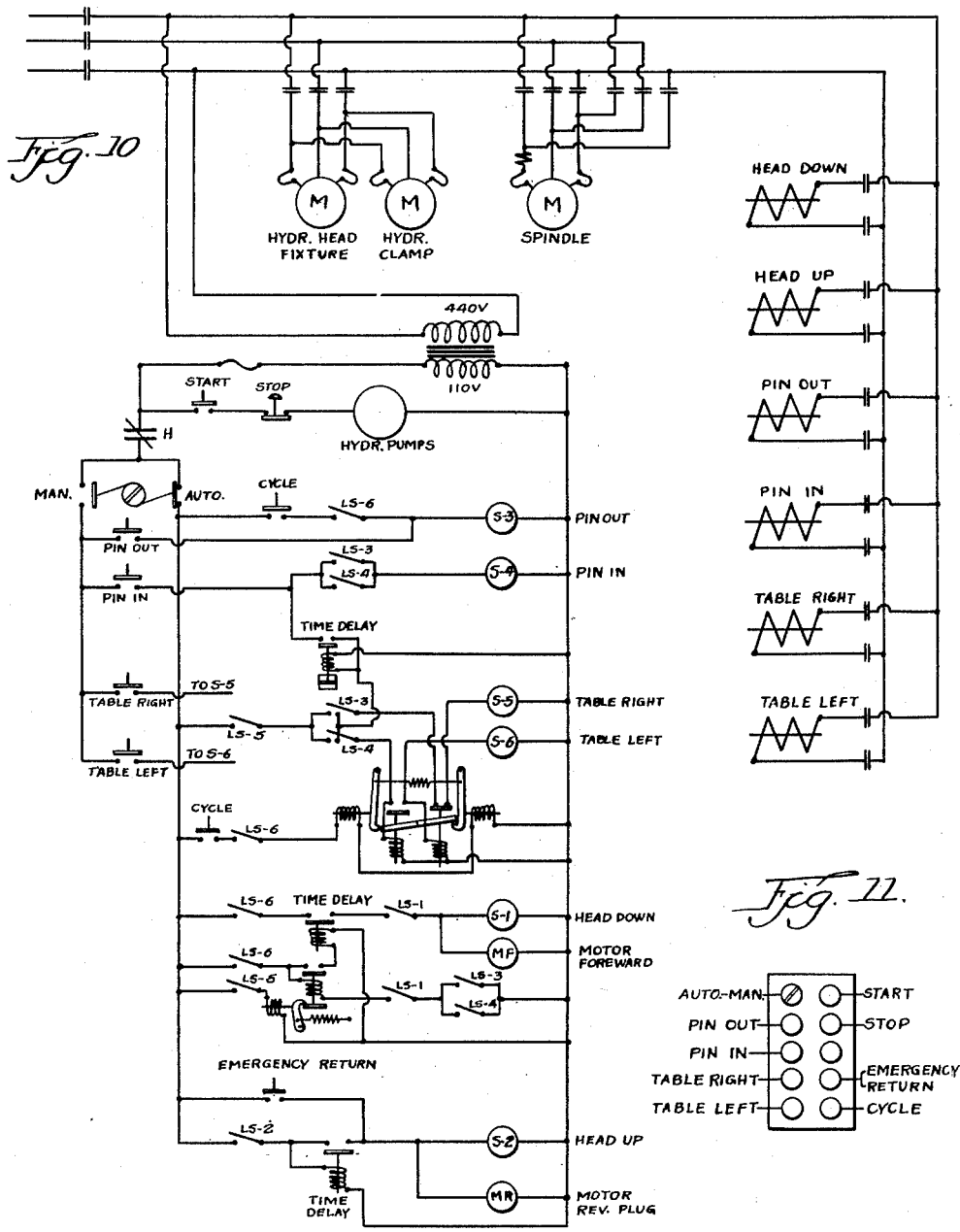

Patented Feb. 20, 1951

2,542,318

UNITED STATES PATENT OFFICE 2,542,318

CAR WHEEL BORING MACHINE

Clyde B. Faverty, Evanston, Ill., and Arthur H. Hartwig, Michigan City, and William J. McDonald, Hammond, Ind., and Louis Wulff, Chicago, Ill., assignors to Pullman-Standard Car Manufacturing Company, Chicago, Ill., a corporation of Delaware Application November 29, 1946, Serial No. 712,852

3 Claims. (Cl. 77—4)

This invention relates to new and improved car wheel boring machines and the method by which the wheels are mounted upon the machine for a boring operation and removed upon completion of the boring operation.

An important object is to speed up the wheel boring operation and increase the production of finished wheels by increasing the cutting speed and reducing the boring bar feed within the limits recommended for carbide tools.

Another object of the invention is to provide means for utilizing the high cutting speeds attainable with carbide tools and attendant reduction of feed rate consequent upon such use in the boring of car wheels.

A primary object of the invention is to provide a car wheel boring machine in which is embodied a reciprocable table having a pair of chuck sets for holding each a wheel fixed against rotation and a rotating spindle carrying a boring bar together with means for automatically locking the table in each of the wheel boring positions and feeding the bar to the work at a predetermined rate.

A further object of the invention consists in the means for alternately loading a wheel on one end of a reciprocable table and unloading a wheel from the other end of the table, with means for automatically locking the table during one or the other of these operations and during the boring operation upon each of said wheels in alternating cycles.

The foregoing and other advantages are achieved by the mechanism described in the specification and illustrated in the accompanying drawings, in which Fig. 1 is a front elevational view of the car wheel boring machine of the invention assembled with loading and unloading devices at opposite ends of the machine, and showing the table with its load of two wheels, shifted to the right and locked, one of the wheels undergoing a boring operation and the finished wheel in the process of being removed from the table by the unloading mechanism at that end and further showing a new wheel ready to be transferred from the raised platform to the table to take the place of the finished wheel;

Fig. 4 is a side elevational view of the machine with portions of the housing wall broken away to show the counterbalancing mechanism for the boring spindle housing and driving mechanism for the spindle and the solenoid operated valve means for controlling the boring bar feeding cycle;

Fig. 5 is a sectional plan view taken on line 5—5, of Fig. 6, showing the table shifting cylinders with respective pistons in the position established when the table is in its locked position at the left of the machine, as indicated in Fig. 3;

Fig. 6 is a front elevational view of the same;

Fig. 7 is a vertical sectional view taken on line 7—7, of Fig. 6, showing the table locking pin assembly with the pin entered in registered socket in the table;

Fig. 8 is a diagrammatic view of the wheel holding chuck assemblies on the table of the machine with mechanism for actuating the chucks separately, together with the control valves and hydraulic pump and motor assembly.

Fig. 9 is another diagrammatic view showing the control system for the mechanism for shifting the table and coordinating its movements with the feeding rate of the spindle and the locking pin actuating mechanism;

Fig. 10 is the electric power circuit for the operation of the machine and controls; and Fig. 11 is an enlarged face view of the switch control panel 128 shown in position on the machine, as indicated in Fig. 3.

Figure 1:
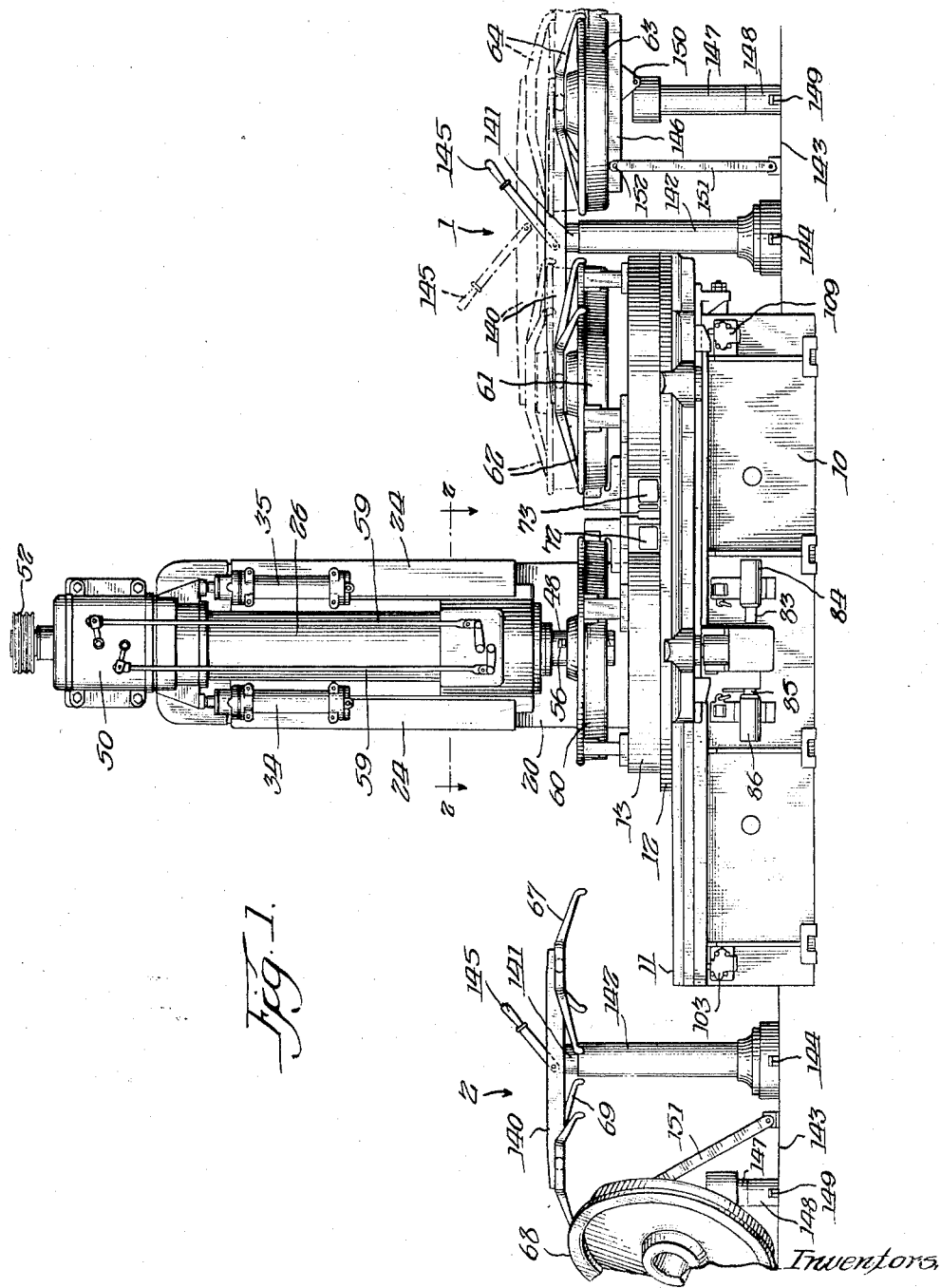

Railroad car wheels are mounted solidly upon the axle and rotate with it as a unit. The attachment of the wheel to the axle is effected by a press-fit, the wheel being bored to smaller size than the wheel seat on the axle, causing the bore of the wheel to expand and grip the axle. It is necessary that these fits be carefully selected to insure a secure connection between the wheel and axle that will hold under the severe operating conditions of railroad service, and it is also necessary to have the bore of the wheel concentric with the circumference of the wheel to assure smooth riding and avoid unnecessary up and down motion of the car body.

In the past, wheels have been bored on a wheel boring machine where the wheel is carried by a rotating table and the boring bar held stationary except for the vertical feed of the bar through the bored hole. On that machine the wheel is held in a five-jaw chuck on a table which rotates with the wheel, the table being supported and retained in its central position by a pintle-type bearing, where the top bearing is a tapered sleeve for centering and the bottom bearing is of the radial type to hold the table in alignment. With such construction the table diameter becomes quite large after allowing for chuck jaws and supports outside of a 38" diameter wheel as compared with the hole to be bored of only about 7" in diameter, and it was found impracticable to rotate this table and wheel fast enough to take advantage of the cutting speeds possible and, in some cases necessary with the better grades of tool steel and carbide tipped tools. It was apparent from our experience with carbide tipped tools on other work, that if we could increase the cutting speed and reduce the feed within the limit recommended for carbide tools, we could produce a better bore, hold size for a greater period of time without tool changes, and improve our wheel mounting practice. In the machine of our invention, as described in the specification, the wheels are held fixed during the boring operation and only the spindle rotates.

In said drawings, the present embodiment of the invention consists primarily of a car wheel boring machine comprising a base portion 10 having rails 11 extending longitudinally thereof, upon which is slidably mounted a reciprocating table 12 equipped with two sets of chuck assemblies 13 operable independently of each other and movable with the table from one end of the machine to the other for a purpose hereinafter to be described. The table is supported upon rails 11 held in position on base 10 by keys 14 and entered in grooves 16 in the underside of the table, as best shown in Fig. 4. As indicated, the grooves on ways 16 are V-shaped and of generous proportions to center the table and retain it in centered position along the longitudinal center line of the bed 10 to compensate for the wear in service of both rails 11 and the grooves 16. Extending rearwardly of the bed section 10 of the machine is a housing portion 20 rising upwardly from its base 21 to a height sufficient to accommodate counterbalancing mechanism 25 for the boring mill housing 26 slidable vertically in the fore part 27 of such housing portion 20 overlying the reciprocating table 12. Housing 20 further contains motor 28 supported at the roof of said housing by bracket 29 and with its armature shaft 30 directly connected with a fluid pump 31 immersed in the body of oil 32 held in tank 33 for supplying hydraulic power to the boring mill housing actuating cylinders 34 and 35 through conduits 36—37 diagrammatically indicated in Fig. 9.

Figure 2:
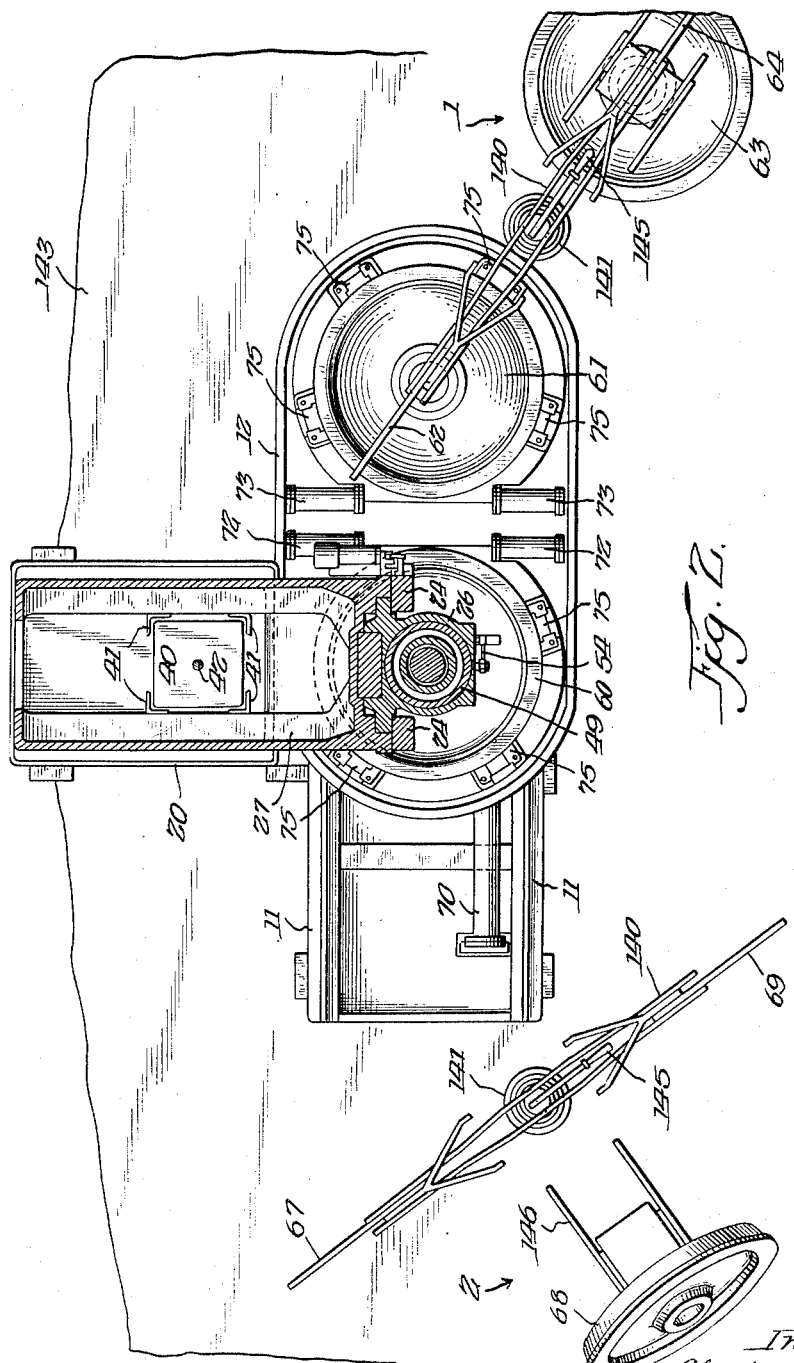
Fig. 2 is a plan view of the same and partly in section taken on line 2—2, of Fig. 1.
Figure 3:
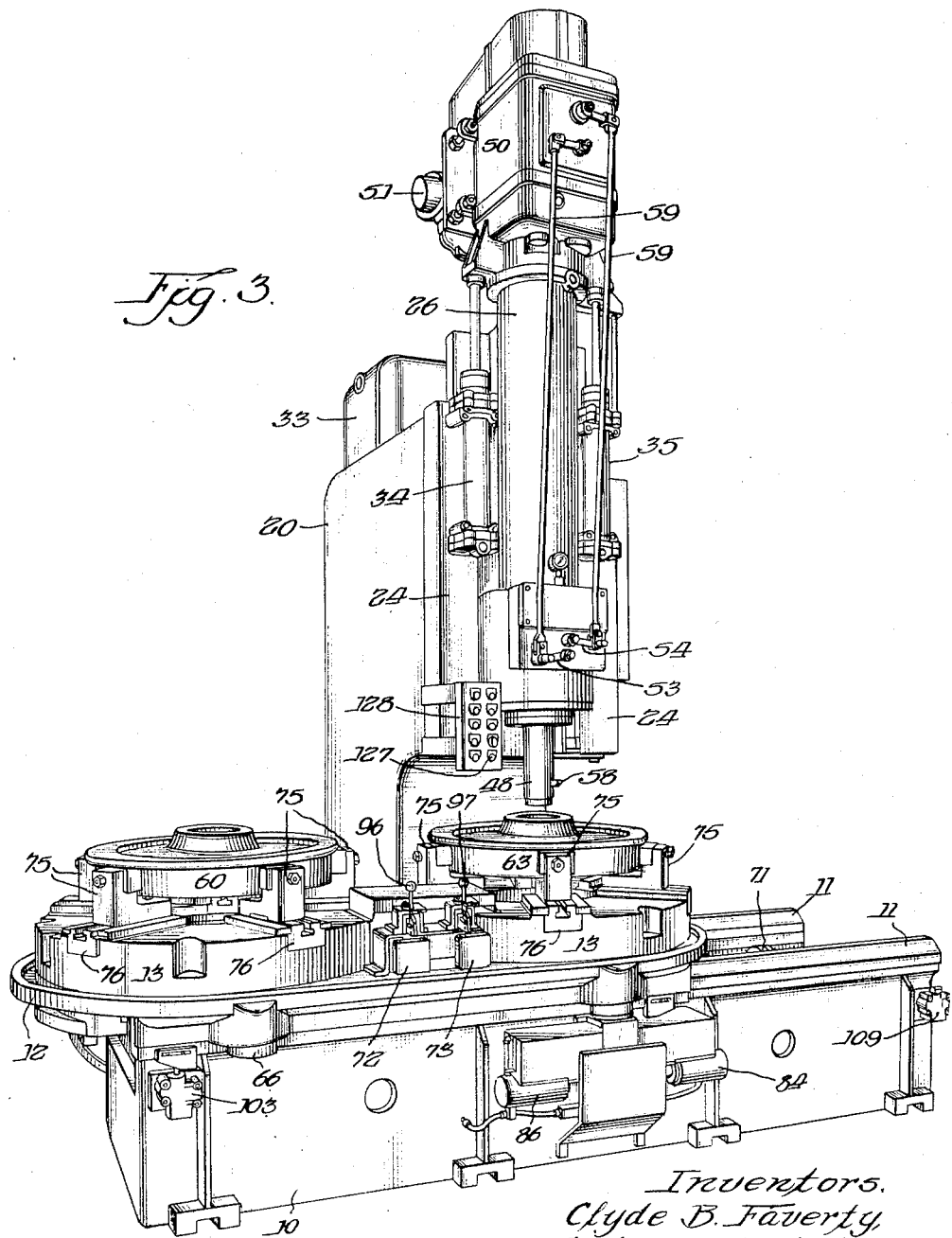
Fig. 3 is a side and front elevational view of the machine showing the wheel table shifted to the left and locked, with the finished wheel in position to be lifted from the table and the new wheel in position beneath the boring bar ready for the boring operation.

As shown in Fig. 4, a counterbalancing mechanism 25 comprising the counterweight portion 40 is movable vertically in guide angles 41 disposed as shown in Fig. 2, and supported by means of a supporting rod 42 suspended from sprocket chain 43 meshing with an idler sprocket wheel 44 and the underside of a second sprocket wheel 45 journaled in bearings 46 secured to the boring mill housing 26 and anchored at its end to the roof of housing 20 by bolt 47, whereby a minimum of effort will be required to actuate the boring mill housing 26 up and down with its contained load of the boring bar 48, the spindle 49 rotatably supporting said boring bar, the variable transmission mechanism in casing 50 and mechanism actuating motor 51 superposed on said housing 26 for rotatably driving the spindle 49, effected in this embodiment by means of the belt coupling 52 indicated in this figure, though obviously such coupling may be by direct connection between said transmission and motor. The use of variable transmission mechanism is designed to drive the spindle 49 at cutting speeds controlled by shaft levers 53 and 54 on the face of the spindle housing 26, connected with rods 59 extending upwardly to the gear casing 50, for the purpose of meshing the gears properly for the speeds desired out of the four available by the operation of these levers. The speeds are selected to accommodate them to the boring of cast iron or steel wheels and for tough or soft materials. As shown in Figs. 1, 3 and 4, the boring bar 48 is equipped with a lower roughing cutter 55, an upper chamfering cutter 56 for boring a starting taper 57 as the last step in the sequence of boring operations on a wheel, and a bore finishing cutter 58 positioned at an intermediate point on the boring bar 48, as shown in Fig. 3. The means for controlling the sequence of these different cutting phases of the boring operation is embodied in the movement downwardly of the boring bar 48 during which the roughing cutter 55 first engages the wheel, followed closely by the bore finishing cutter 58, after which the final chamfering operation is performed by cutter 56 to form the bore taper 57 to facilitate pressing the finished wheel upon the axle as before explained. As indicated in Fig. 9, the controls are set to feed the boring bar and spindle downwardly to the work rapidly until the boring position shown in Fig. 4 is reached, when the downward travel is slowed down to the predetermined feeding rate followed by a slight dwell when the motor circuit shown in Fig. 10 is interrupted to permit boring bar and spindle to recede to their normal upper position of rest as indicated in Fig. 3, under the impetus of operating cylinders 34 and 35 shown in Figs. 1, 3, 4 and 9. This boring bar feed mechanism is interlocked with mechanism for shifting and locking the table 12 to prevent the starting of the boring operation until the table is properly locked in place in either of the positions shown in Figs. 1 and 3.

The table 12, mounted as described, is shiftable with its load of two wheels 60 and 61, one of which, 61, has been finished and ready to be unloaded by the loading and unloading mechanism 1 installed at the right hand end of the boring mill as depicted in Fig. 1, and the other wheel, 60, in that figure, undergoing a boring operation with the boring bar 48 in its lowermost position with chamfering cutter 56 operatively engaging the wheel. During the boring operation on wheel 60, the finished wheel 61 is lifted off the table by the tongs 62 of the unloading mechanism 1 and a new wheel 63 deposited on said table by the lifting tongs 64 actuated in a manner presently to be described. With new wheel 63 in position and boring of wheel 60 completed, the table 12 is released by withdrawal of locking pin 65 from registered socket 66, by mechanism shown in Figs. 1, 5 through 7, and 9, operable automatically upon lifting of the spindle 49 and boring bar 48, and automatically shifted with its load of finished wheel 60 and new wheel 63 toward the position shown in Fig. 3, wherein the finished wheel 60 is brought into position to be lifted off the table by the loading and unloading mechanism 2 installed at the left hand end of the machine while the wheel 63 is in centered position for the boring operation with the boring bar 48 ready to be lowered into engagement with said wheel automatically upon upward thrust of locking pin 65 into registered socket 66 by mechanism indicated in Figs. 3, 5 through 7, and 9, whereupon tongs 67 of unloading mechanism 2 will remove wheel 60 from the table 12 and a new wheel 68 deposited upon the table by the companion lifting tongs 69, during which time the boring operation upon wheel 63 may be carried to completion.

The operating mechanism for shuttling the table 12 between the loading and unloading installations 1 and 2 at opposite sides of the machine and the coordinating mechanisms for locking and unlocking the table automatically and in timed relationship with up and down movements of the boring bar spindle housing shown diagrammatically in Fig. 9, all derive their power from oil under pressure delivered by fluid pump 31 driven continuously by motor 28. The table is power actuated by hydraulic cylinders 70 and 71, disposed as graphically illustrated in Fig. 9, and on opposite sides of the bed 10 as indicated in Figs. 2 and 4, one actuates the table in one direction and the other shifts the table to the limit of movement in the opposite direction. As shown in Figs. 1 through 4, the wheels to be operated upon are placed upon the chuck assemblies 13 fitted to the table 12 in fixed relationship with each other and the table and equipped with sets of 5-jaw chucks 75 movable radially in ways 76. The jaws 75 are operated to grip the wheel upon actuation of piston racks 77 and 78 from cylinders 72 and 73, respectively, and meshing with pinions 79 and 80 formed with cam slots 81 and 82 arranged to open and close the chuck jaws movable in guides 76. The jaws 75 are operated independently of all other functions of the machine and the chucks of each assembly 13 are operable independently of each other as a safety measure. The chuck assemblies are hydraulically driven by fluid pump 90 and motor 91 housed in the base 10 of the machine and shown diagrammatically in Fig. 8 with circuits 92 and 93 extending to respective 4-way valves 94 and 95 manually operable by control handles 96 and 97, respectively. The valves are interlocked to prevent the opening of the chucks of the two assemblies 13 simultaneously but arranged to permit the chucks to be closed either individually or together.

When the table shift control is actuated, the table 12 shifts to place a wheel under the boring bar 48 through the medium of the fluid delivered from pump 31 to 4-way valve 98 which controls the movement of the locking pin 65. As best shown in Figs. 5, 6, 7 and 9, the pin is lifted into registered socket 66 through wedging action of inclined plane on block 99 under thrust of piston 83 actuated from hydraulic cylinder 84, and pin is withdrawn from socket 66 by wedging action of inclined plane on block 99 under thrust of piston 85 in cylinder 86. The pin actuating mechanism described is interlocked with the bar feed control in a manner to prohibit the starting of the feed until the table 12 has been properly locked in place. When the locking pin has been raised through action of pressure cylinder 84 requiring pressure in line 87, this pressure would be carried through line 88 to the bottom side of sequence valve 89 which then would be forced to its closed position, allowing pressure to be built up in either of the lines that actuate the table through cylinders 70 and 71, hydraulic pressure being carried directly through 4-way valve 98, through line 100, to 4-way solenoid operated valve 101. Manifestly, if valve 101 is in position to deliver fluid pressure to line 102, and sequence valve 89 is in closed position, fluid pressure will be carried through check valve 103 and orifice 104 to line 105 and to cylinder 70, the table 12, under thrust of piston 106 against abutment 107 on the table, would be shifted to the right as viewed in Figs. 1, 2 and 9, and if valve 101 is in position to deliver fluid to line 108, fluid pressure will be carried through check valve 109 and orifice 110 to cylinder 71, the table, under thrust of piston 111 against abutment 107 on the table would be shifted in the opposite direction. As the table approaches the end of its travel in either direction of movement, the check valve 103 is closed mechanically by wedge action as best shown in Fig. 3, when table moves to the left in this figure, or when check valve 109 is closed by wedge action when table moves in reverse direction to the right as shown in Figs. 1 and 9, all of the pressure fluid is caused to flow through restrictive orifice 104 or 110 to greatly slow the travel of the table to act as a cushion against shock at the end of the stroke.

After the table has reached a position at the end of its travel, electric switches 112 or 113 will be contacted by points 114 or 115, operating to energize the solenoid that shifts the 4-way valve 98 to allow fluid pressure to flow into line 116 and cylinder 86 which engages the lock pin in the table. In locked position, the pin 65 closes switches 117 and 118 that are interconnected with the motor starting circuit through a solenoid operated relay. Fluid pressure is carried through solenoid operated 4-way valve 101, through line 120, to control station 121. The motor, having been energized, quickly picks up speed and, at the same time, fluid pressure is carried through control station 121 to the top of cylinders 34 and 35 through lines 122 and 123, whereby the boring bar 48 is fed down to the work. When the bar has reached the boring position, its downward travel is retarded to the proper feeding rate, and it continues on through the work until the feeding cycle is interrupted by the opening of switch 124 shown in Fig. 9, whereupon the solenoid operated valve at control station 121 is actuated to interrupt the motor circuit and return the boring bar assembly to its upper position through fluid pressure carried to the bottom of cylinders 34 and 35 through lines 125 and 126. The solenoid operated valve at control station 121 is so constructed as to provide a dwell at the end of the feeding cycle before the cylinders are restored to starting condition indicated in this figure to complete the boring cycle. Upon completion of this cycle, the operator presses the cycle button 127 on the control panel 128 shown in Fig. 3, which energizes the solenoid operating valve 98 to withdraw locking pin 65 from registering socket 66 to unlock table 12 through line 116 to cylinder 86 as shown in Fig. 9. When piston 85 has completed its travel, switch 117 is closed to energize solenoids operating the valve 101 to shift the table to the new working position and closing switches 112 or 113 which, in turn, will energize the solenoid operating the valve 98 to cause the locking pin 65 to again enter a registering socket 66 to lock the table, at which time, the switch 118 is contacted, which again starts the driving motor 51. The contact switches which control the position of the boring cycle are shown at 124 and 119 in Figs. 4 and 9 and controlled during up and down movement of the spindle housing 26 by means of actuating blocks 130 slidably positioned on rod 129 attached to spindle housing 26 and moving with it, whereby the position of the blocks 130 traveling with the rod and housing actuates the switches 124 and 119 at predetermined positions and in proper sequence. The spindle housing 26, it will be noted, within which the spindle 49 rotates, is itself movable vertically between guides 24 secured to the face of the machine, as best shown in Figs. 1 through 4.

The electric power required for the operation of the machine and controls, is derived from three incoming power lines 18 as shown in Fig. 10, and indicating 3-phase source of power at 440 volts and 60 cycles. These electric circuits are carried through the proper starting switches to the two motors 28 and 91 for driving the fluid pumps 31 and 90, respectively, and to the motor 51 for driving the spindle 49 through the starting switches on panel 128. This motor drive 51 is provided with a reversing switch for so-called plugging of the motor to quickly stop the rotation of the entire mechanism at the end of the operating stroke. In Fig. 10, the power lines are shown extending to solenoids of valves 98, 101 and 121, and these solenoids are energized in their proper sequence through the switches shown in this figure. Power is also taken from the incoming circuit to energize the transformer 17, indicated in this figure, for the purpose of reducing the voltage to a safe amount for the push button and other control circuits.

To start the machine, the "start" switch designated in the circuit of Fig. 10, energizes the motors 28 and 91 to drive hydraulic pumps 31 and 90, respectively, and when operating pressure has become established, switch H will close to energize all the switches controlled from panel 128, shown in Fig. 11. The "selector switch" is either turned to "manual control" or "automatic control" and as indicated in the upper left hand corner of the panel, the switch is indicated with the "automatic control" circuit closed. To start the cycle, the "cycle" button at lower right hand of the panel is pushed. The locking pin 65 is in and switch LS—6 (118) is closed and solenoid S—3 will be energized momentarily which will shift the 4-way valve 98, and the locking pin 65 will be forced out of its socket 66 which closes switch LS—5 (117). The table 12 is either in the right or left hand position and either switch LS—3 (113) or LS—4 (112) is closed. Assume LS—3 (113), current will not be carried to S—4 at valve 98 which operates the locking "pin in" because of the "time delay" switch which must close before the "pin in" circuit is completed but will be carried through S—5 at 4-way valve 101 to shift the table 12 to the right. As soon as the table starts to shift, both switches LS—3 (113) and LS—4 (112) will be opened and will stop the "pin in" operation as this opens the "time delay" until the table shift is complete and the switch LS—4 (112) is closed and the "time delay" coil is again energized. An interlock switch is provided which will prevent the table shift cycle repeating before switch LS—6 (118) has been energized and the cycle button on panel 128, pushed again.

As soon as the locking pin 65 is "in" and switch LS—6 (118) closed, the motor circuit will be closed along with the down feed through switch S—1, at valve 121, providing switch LS—1 (119) is closed, which means that the head must start from the up position and the table be shifted with either switch LS—3 (113) or LS—4 (112) closed. The motor control circuit is also provided with a mechanical interlock which is released by the closing of switch LS—5 (117) or the "pin out" position to assure this operation be performed in the proper sequence and to prevent the "head down" operation from re-cycling. Closing of switch LS—2 (124) at the end of the down stroke through the "time delay" provides the dwell at the end of the stroke before the motor is reversed or plugged and switch S—2, at valve 121, energized, which returns the head to the upper or starting position. The "pin in," "pin out," "table right" and "table left" operations can be accomplished manually, if necessary, in the event of failure of any of the automatic circuits, as will be obvious.

From the foregoing description of the car wheel boring machine of this invention, it will be noted that although the disclosure proceeds upon the assumption that the use of three cutters 55, 56 and 58 is desirable, it may be found practicable to dispense with one or the other of cutters 55 and 58, the machine having been designed so that but one of such cutters can be used to complete the bore to size in one pass. The rigid frame construction, the large spindle diameter, the flanged stub bar 48 with a minimum of unsupported length, and the carbide tipped tools with a low rate of wear, are all proportioned, processed and assembled to withstand the weight and speed of handling of the materials to be worked upon.

The safety of operation of the whole machine and the precision of the control system described and its simplicity render possible the expeditious handling of the product at a minimum of expense. The loading and unloading installations 1 and 2, depicted in Figs. 1 and 2 disposed at opposite sides of the machine, are in accordance with the mechanism covered in Patent 1,541,527 of 6–9–25 to Gomert Powell, and found to lend themselves commendably to the system of operation incident to the operation of the reciprocable table wherein a wheel is deposited upon the table at one end of the machine and carried by the table to the boring position, during which operation another wheel is deposited upon the table at the opposite end of the machine, then upon completion of the boring operation on the first wheel deposited, the table will be shifted in the reverse direction to bring the second wheel deposited to the boring position, and the finished wheel is then removed and another wheel deposited on the table to take its place, so that upon completion of the boring operation on the other wheel at the other end of the table, the table will again be shifted to permit removal of that wheel from the table and the loading of another wheel from the stock pile at that side of the machine, all as depicted in Figs. 1, 2 and 3, and previously outlined.

The loading and unloading installations 1 and 2 comprise each the transferring tong mechanism 140 having a supporting standard 141 slidably and rotatably mounted in the cylinder 142 secured to the floor 143 of the shop and operatively connected with a hydraulic or compressed air pressure system beneath the floor (not shown) and effective upon operation of the valve 144 to raise or lower the standard 141 to bring the transferring mechanism 140 into position to deposit work on the clutch assemblies carried by the table or to remove it after a boring operation and controlled by lever 145 operatively connecting respective lifting tong members 62 and 64 and 67 and 69. The installations further comprise the wheel hoisting platform 146 upon which a wheel from the stock pile may be rolled preparatory to elevating the same and from which a finished wheel may be rolled upon lowering of the platform. The raising and lowering of the platform 146 is effected by means of supporting standard 147 slidably mounted in cylinder 148 also secured to the shop floor 143 and connected to the pressure system before referred to, and operatively controlled by valve pedal 149.

To effect automatic tilting of platform 146 from the horizontal raised position to a lower tilted position at the floor line, the platform is pivotally secured to supporting standard 147 at 150. The platform is tilted during the raising and lowering operation by link 151 pivotally anchored to the floor and secured at its upper end to the platform by pin 152 whereby the downward movement of the supporting standard 147 will cause the link to function as a strut to hold the free edge of the platform raised with respect to the lowered portion of the platform at pivot 150, in which position of the platform, a completed wheel may be removed from it and another one mounted in its place, as indicated at the left of Figs. 1 and 2.

What is claimed is:

1. In a car wheel boring mill installation including loading and unloading means for alternately delivering and removing work to and from the boring mill at its opposite ends, a wheel boring machine comprising a base portion having rails extending longitudinally thereof, a table slidably mounted upon said rails having two sets of chuck assemblies operable independently of each other adapted each to retain a car wheel to be bored and reciprocable with the table between said loading and unloading means, an upright housing section extending rearwardly of the base portion and rising substantially above the level of the table centrally of said machine, a boring mill housing assembly extending above the level of the upright housing section in overlying relationship to said table and slidably mounted in the face of said housing section for vertical reciprocation toward and away from the work on the table, a boring-bar spindle supported for rotation in said housing assembly, a driving motor mounted on the housing assembly above said housing section, a driving connection between the motor and said boring-bar spindle including multi-speed mechanism operatively engaging said spindle and carried by said housing assembly, hydraulic cylinder mechanism for raising and lowering said housing assembly, and means on the housing assembly for controlling said multi-speed mechanism.

2. A car wheel boring machine comprising a base portion having rails extending longitudinally thereof, a reciprocating table slidably mounted upon said rails and having two sets of chuck assemblies operable independently of each other and movable with the table from one end of said base portion to the other adapted each to retain a car wheel to be bored, an upright housing section extending rearwardly of the base portion and rising substantially above the level of said table centrally of the machine, a boring mill housing assembly slidable vertically in guides on the face of said upright housing section overlying said reciprocating table and extending above the level of the housing section and including a boring-bar spindle rotatably mounted in the boring mill housing, a driving motor mounted on the boring mill housing above said upright housing section, a driving connection between said motor and boring-bar spindle including multi-speed mechanism carried by the boring mill housing and means on the housing for controlling said mechanism, mechanism in said upright housing section counterbalancing the vertical reciprocations of said boring mill housing assembly, hydraulic means for actuating said reciprocating table alternately to locate one of said chuck assemblies and contained wheel beneath said boring-bar spindle, hydraulic means for raising and lowering said boring mill housing assembly between an upper position of rest and a lower operative position for boring said wheel, and hydraulic power supply means for both said hydraulic means mounted in said housing section.

3. A car wheel boring machine comprising a base portion, a reciprocating table slidably mounted on said base portion and having two sets of chuck assemblies operable independently of each other adapted each to contain a car wheel to be bored and movable with the table from one end of said base portion to the other, an upright housing section associated with the base portion centrally of the machine and rising above the level of said table, a boring mill housing assembly slidable vertically on the face of said upright housing section overlying said reciprocating table and including a boring-bar spindle rotatably mounted in the housing, a driving motor for the spindle carried by said housing assembly, multi-speed gear mechanism between the driving motor and said spindle, control means on the housing assembly for selectively engaging the gear mechanism to adjust the rotative speed of said spindle, hydraulic means for actuating said reciprocating table alternately to locate one of said chuck assemblies and contained wheel beneath said boring-bar spindle, hydraulic means for raising and lowering said boring mill housing assembly between an upper retracted position and a lower operative position for boring said wheel, and hydraulic power supply means for both said hydraulic means.

CLYDE B. FAVERTY.
ARTHUR H. HARTWIG.
WILLIAM J. McDONALD.
LOUIS WULFF.

REFERENCES CITED

The following references are of record in the file of this patent:

UNITED STATES PATENTS

| Number | Name | Date |
|---|---|---|
| 497,738 | Wood | May 16, 1893 |
| 1,392,304 | Davis | Oct. 4, 1921 |
| 1,433,818 | Hill | Oct. 31, 1922 |
| 1,541,527 | Powell | June 9, 1925 |
| 1,649,411 | Kaseberg | Nov. 15, 1927 |
| 2,019,814 | Holmes et al. | Nov. 5, 1935 |
| 2,195,861 | Hunt | Apr. 2, 1940 |
| 2,395,518 | Svenson | Feb. 26, 1946 |

OTHER REFERENCES

Krause Catalog, "Feinbohren," page 7, Feb. 4, 1937. (Copy on file in Div. 68, class 77.)